(12) United States Patent
LeVey et al.

(10) Patent No.: US 7,101,134 B2
(45) Date of Patent: Sep. 5, 2006

(54) FASTENER HAVING MULTIPLE LOBED THREAD

(75) Inventors: Kenneth LeVey, West Chicago, IL (US); David C. Hempfling, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 205 days.

(21) Appl. No.: 10/095,404

(22) Filed: Mar. 12, 2002

(65) Prior Publication Data

US 2002/0192051 A1     Dec. 19, 2002

Related U.S. Application Data

(63) Continuation-in-part of application No. 09/885,796, filed on Jun. 19, 2001, now Pat. No. 6,899,500.

(51) Int. Cl.
*F16B 35/04* (2006.01)
(52) U.S. Cl. ................... 411/411; 411/412; 411/416; 411/308
(58) Field of Classification Search ............... 411/411, 411/412, 416, 417, 308–311, 386, 387.4
See application file for complete search history.

(56) References Cited

U.S. PATENT DOCUMENTS

| | | |
|---|---|---|
| 23,409 A | 3/1859 | Thom |
| 3,258,797 A | 7/1966 | Budd |
| 3,455,198 A * | 7/1969 | Barrett .................... 411/388 |
| 3,661,194 A | 5/1972 | Macfarlane et al. |
| 4,069,730 A | 1/1978 | Gutshall |
| 4,430,036 A | 2/1984 | Chapman |
| 4,486,135 A | 12/1984 | Kazino |
| 4,637,767 A | 1/1987 | Yaotani et al. |
| 4,652,194 A | 3/1987 | Tajima et al. |
| 4,716,751 A | 1/1988 | Wozniak |
| 4,718,802 A | 1/1988 | Rockenfeller et al. |
| 4,793,219 A | 12/1988 | Wozniak |
| 4,793,220 A | 12/1988 | Yamamoto et al. |
| 4,818,165 A | 4/1989 | Shirai |
| 4,820,098 A | 4/1989 | Taubert et al. |
| 4,842,467 A | 6/1989 | Armstrong |
| 5,044,853 A | 9/1991 | Dicke |
| 5,061,136 A | 10/1991 | Dixon et al. |
| 5,088,869 A * | 2/1992 | Greenslade .................. 411/386 |
| 5,110,245 A | 5/1992 | Hiroyuki |
| 5,188,496 A | 2/1993 | Giannuzzi |
| 5,385,439 A | 1/1995 | Hurdle |
| RE34,969 E | 6/1995 | Dixon et al. |

(Continued)

FOREIGN PATENT DOCUMENTS

DE    197 35 280 A 1     8/1997

(Continued)

*Primary Examiner*—William L. Miller
(74) *Attorney, Agent, or Firm*—Fletcher Yoder

(57) ABSTRACT

A threaded fastener includes a lead having bosses separated from one another by bases along the thread crest. The lead-in and lead-out profiles of the bosses, and other features of the bosses and bases may differ from one another along the fastener shank. The lead-in and lead out profiles may have linear and non-linear surfaces. The lead-in and lead-out profiles may have cutting edges angled toward the direction of propagation of the bosses. The boss profiles may be selected to reduce insertion torque and to provide excellent resistance to pullout. The fastener may be formed by roll threading via a tool made by a plunge EDM process.

8 Claims, 6 Drawing Sheets

U.S. PATENT DOCUMENTS

| | | |
|---|---|---|
| 5,674,035 A | 10/1997 | Hettich et al. |
| 5,779,417 A | 7/1998 | Barth et al. |
| 5,827,030 A | 10/1998 | Dicke |
| 5,885,041 A | 3/1999 | Giannuzzi et al. |
| 5,897,280 A | 4/1999 | Dicke |
| 5,921,735 A | 7/1999 | Hughes |
| 5,957,646 A | 9/1999 | Giannuzzi et al. |
| 5,961,267 A | 10/1999 | Goss et al. |
| 6,045,312 A | 4/2000 | Hsing |
| 6,056,491 A | 5/2000 | Hsu |
| 6,086,302 A | 7/2000 | Gerhard |
| 6,254,327 B1 | 7/2001 | Chen |
| 6,314,778 B1 | 11/2001 | Moro et al. |
| 6,340,277 B1 | 1/2002 | Koenig et al. |
| 6,450,748 B1 * | 9/2002 | Hsu .................. 411/387.4 |

FOREIGN PATENT DOCUMENTS

| | | | |
|---|---|---|---|
| EP | 1 270 963 | | 1/2003 |
| FR | 1.292.780 | | 6/1961 |
| GB | 1120991 | * | 7/1968 ............ 411/417 |
| GB | 1 245 618 | | 9/1971 |
| GB | 1 482 624 | | 8/1977 |

* cited by examiner

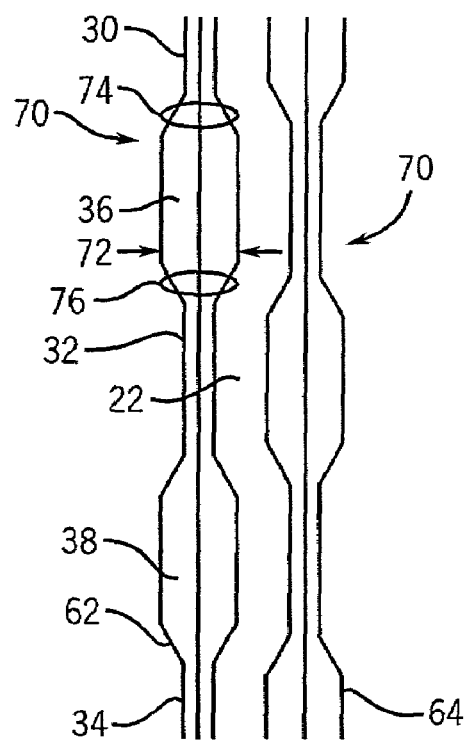
FIG. 6
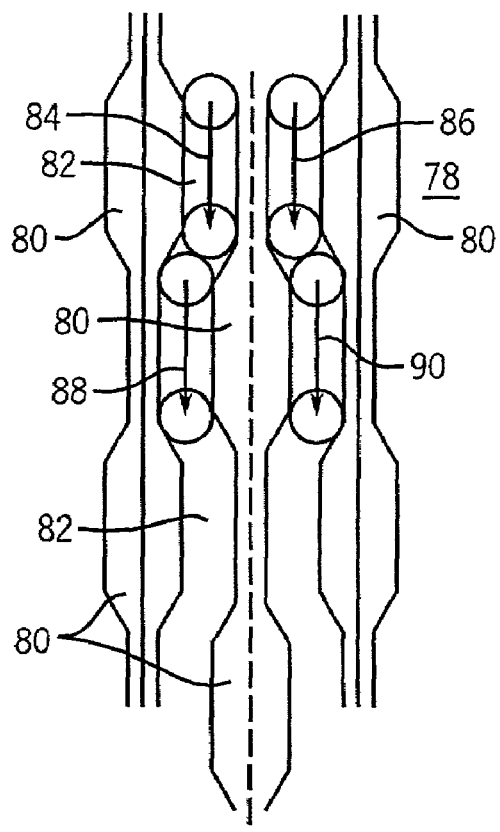
FIG. 7
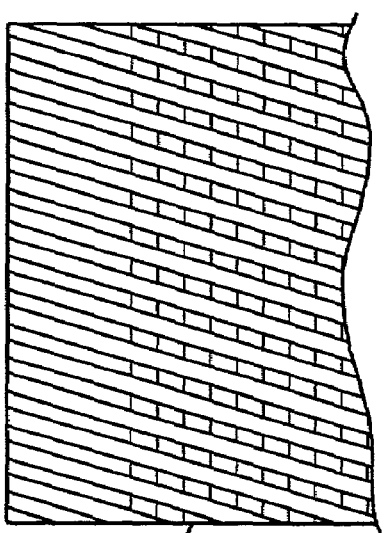
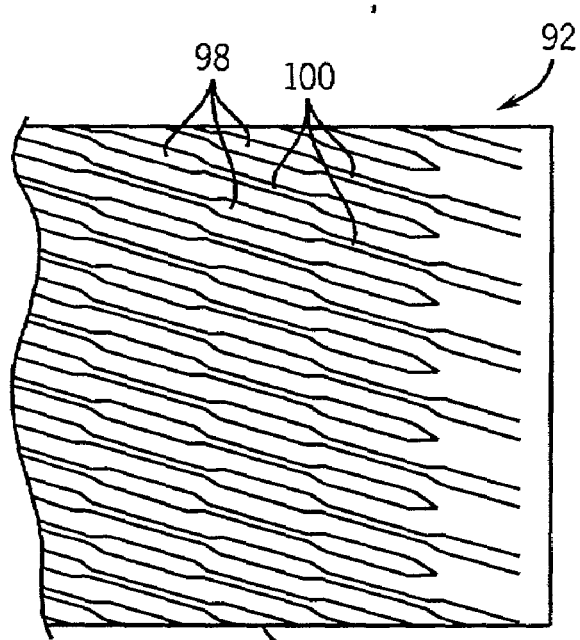
FIG. 8

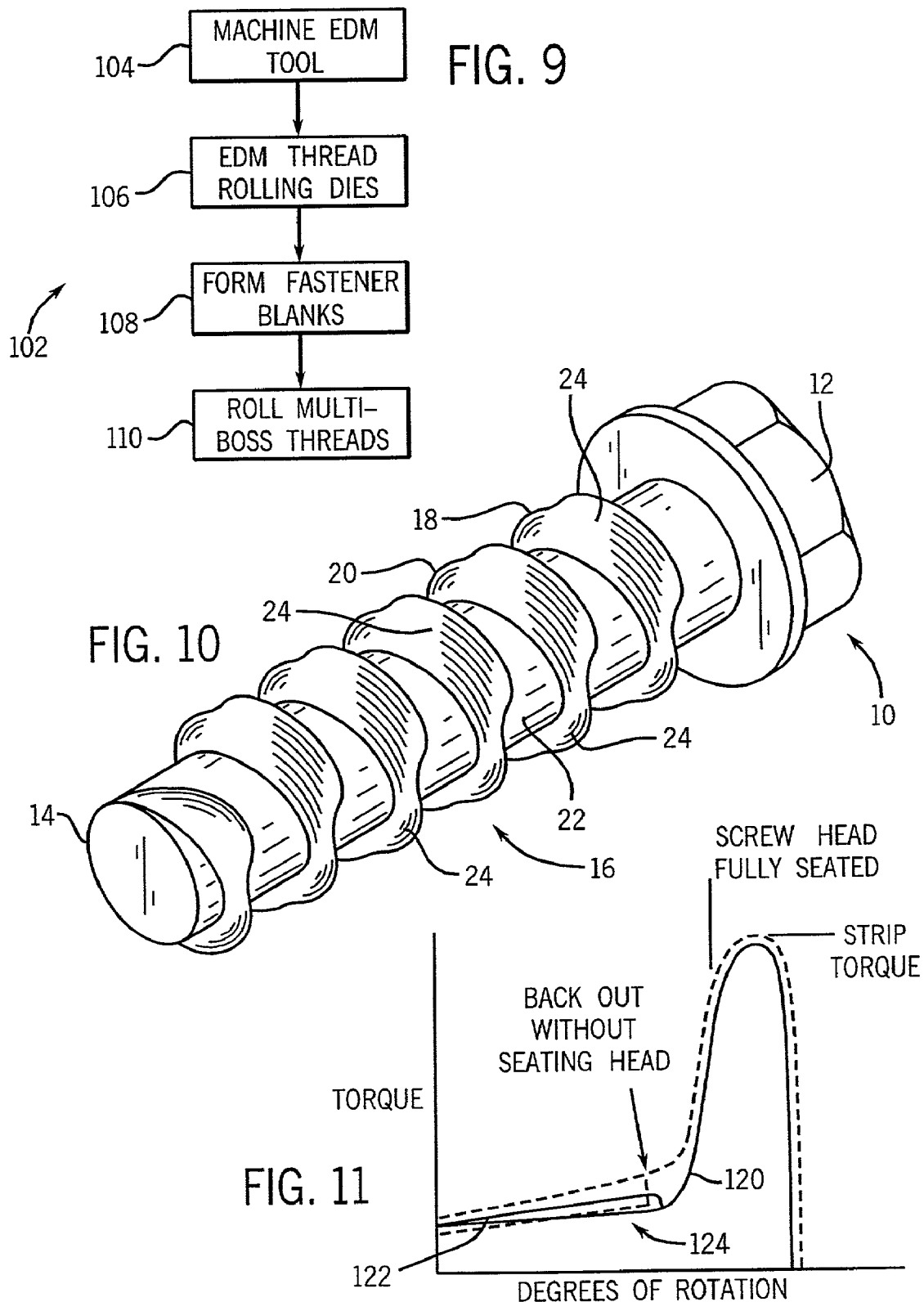

US 7,101,134 B2

FASTENER HAVING MULTIPLE LOBED THREAD

This application is a continuation-in-part of U.S. patent application Ser. No. 09/885,796, filed on Jun. 19, 2001, which issued on May 31, 2005, as U.S. Pat. Ser. No. 6,899,500.

BACKGROUND OF THE INVENTION

The present invention relates generally to the field of fasteners, and more particularly to a fastener having at least one lead form with multiple bosses to provide improved insertion and pullout properties.

In the field of fasteners, particularly threaded fasteners, a wide range of configurations are known and currently available. In general, threaded fasteners present a threaded shank on which one or more leads are formed. The leads create a helical inclined plane which contacts mating surfaces of one or more mechanical components as the fastener is rotated for insertion or removal. Various threaded fastener designs have been specifically adapted for use with various materials, such as wood, metals, composite materials, concrete, and so forth.

In most conventional threaded fasteners, a head is formed at the end of the threaded shank to facilitate rotation of the fastener into and out of an application. The shank itself presents a lower tip opposite the head, with the lead of the thread being formed around the shank. The characteristics of the lead determine both the torque required to insert the fastener into the application, the torque required to remove the fastener, and the force which resists pullout of the fastener once in place. In most conventional applications, the thread is uniform in shape over the entire shank, with a reduction in height being provided in certain applications, such as for wood or metal screws.

Specialty fasteners have been developed that present a variety of features along the lead. For example, screws having ridges or depressions along the lead have been developed, such as for penetrating into certain materials during insertion. In general, however, these designs have presented less flexibility and less than optimal performance in use. There is still a need, therefore, for improved fasteners which can be adapted for particular purposes and materials, through creative lead design. There is a particular need for fasteners which present relatively uniform or constant insertion torque characteristics, with excellent pullout resistance, and which can be manufactured in straightforward and inexpensive ways. There also is a need for a technique to enable the heights and widths of various portions of a lead form to be varied along their lengths, as well as varying the rates of change of the heights and width. In addition, there is a need for a technique to enable linear and non-linear surfaces to be formed along the lead form.

SUMMARY OF THE INVENTION

The present technique provides an improved fastener design which responds to such needs. The fastener presents a lead which includes multiple bosses separated by recesses. The bosses may be identical to one another along the entire length of the lead, or may be varied to provide the desired characteristics. For example, the lead-in of the bosses need not be identical to the lead-out, and the lead-in and lead-out of bosses along the length of the leads may vary. Similarly, the length, height and form of the bosses may vary along the length of the leads. The lead-in and lead out profiles may have linear and non-linear surfaces. The lead-in and lead-out profiles also may have cutting edges angled toward the direction of propagation of the bosses. Where more than one lead is provided, overlap between the bosses formed on the lead may be provided so as to maintain generally uniform torque during insertion of the fastener in an application. The recesses between the bosses also offers locations in which certain materials may be allowed to collect, such as cold-flow plastics, plaster or concrete, or so forth. The lead-out of the bosses may be formed so as to provide enhanced pullout resistance.

The fasteners designed in accordance with the present techniques may be used in a wide variety of applications. They are particularly well suited, however, to applications in which the fastener interfaces directly with one or more materials to be secured, such as concrete, metals, plastics, wood, and other composite materials. The overall configuration of the leads and bosses can be adapted specifically to such materials, and to the desired level of insertion torque pullout resistance, and so forth. The fasteners are particularly adapted, moreover, for mass production, such as through roll thread forming operations.

BRIEF DESCRIPTION OF THE DRAWINGS

The foregoing and other advantages of the invention will become apparent upon reading the following detailed description and upon reference to the drawings in which:

FIG. 6 is a plan view of two leads, shown extended vertically, illustrating overlap between portions of the leads;

FIG. 7 is a plan view of a portion of a tool used in forming a die for machining the fasteners, such type illustrated in FIG. 6, in a roll threading operation;

FIG. 8 is an elevational view of a face of an exemplary die formed through the use of a tool such as that illustrated in FIG. 7;

FIG. 9 is a flow chart illustrating exemplary steps in a manufacturing process for creating fasteners in accordance with the present technique through electric-discharge machining of dies, and roll forming of multiple boss threads;

FIG. 10 is a perspective view of an alternative configuration for a fastener in accordance with aspects of the present technique having a single lead;

FIG. 11 is a graphical representation of torques encountered for insertion of a double-lead fastener in accordance with the aspects of the present technique;

DETAILED DESCRIPTION OF SPECIFIC EMBODIMENTS

Figure 1:
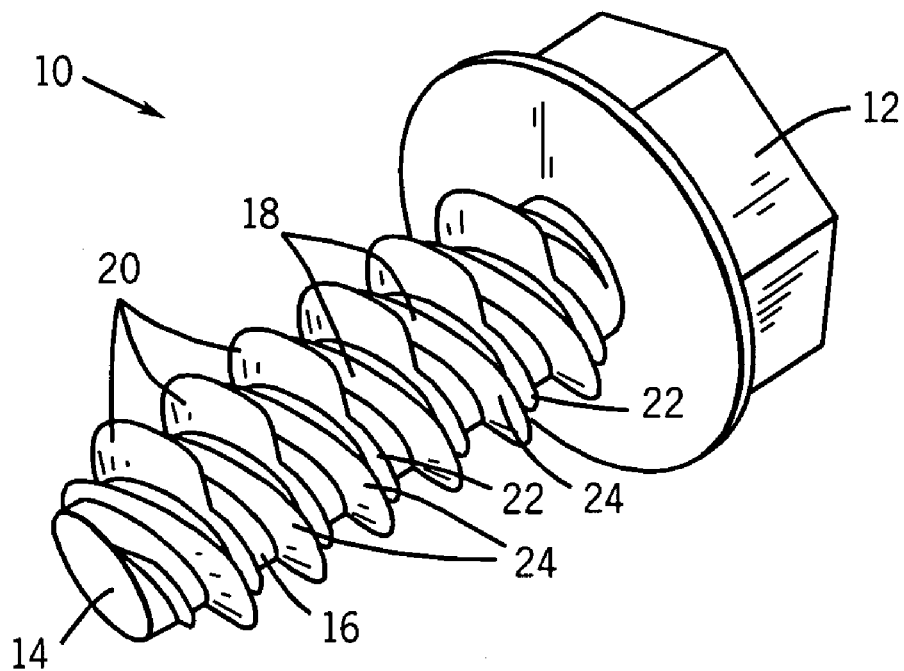
FIG. 1 is a perspective view of a threaded fastener in accordance with aspects of the present technique.

Turning now to the figures, and referring first to FIG. 1, an exemplary fastener formed in accordance with aspects of the present technique is illustrated and designated generally by the reference numeral 10. Fastener 10 includes a head 12 a tip 14, and a threaded shank section 16. Any suitable head and tip portion may be employed in the fastener, such as the hex head illustrated in FIG. 1. The tip portion may be similar in diameter to the threaded shank portion, or may be profiled, such as to facilitate insertion into certain materials.

In the illustrated embodiment, fastener 10 has one or more leads which are configured in accordance with aspects of the present technique. In the embodiment illustrated in FIG. 1, two such leads 18 and 20 are provided and have similar or identical configurations, displaced 180 degrees at corresponding locations along shank 16. As described below, the configurations may also be different between the multiple leads, where such multiple leads are provided, and the configurations may evolve along the length of each lead. Even where a single lead is provided, as discussed below, features formed along the single lead may evolve between tip 14 and head 12. In general, each lead presents a base 22, and a series of bosses 24 rising from the base. The particular forms of the bases and bosses provided on the leads, and presently favored methods for forming these features are described in greater detail below.

Figure 1A:
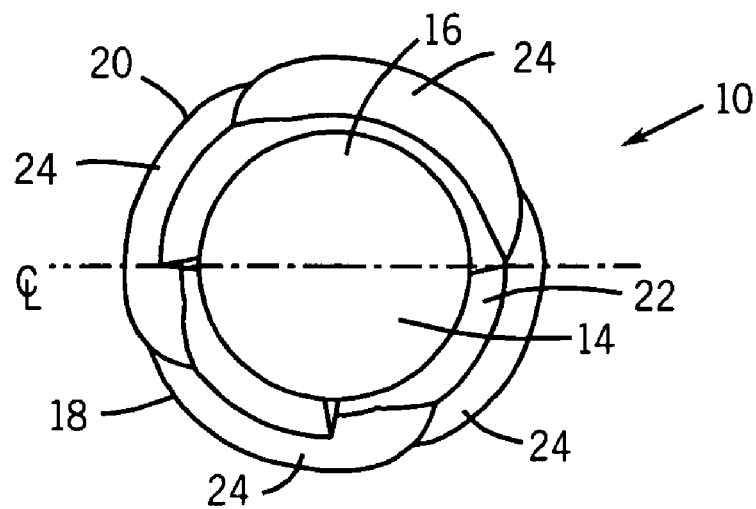
FIG. 1A is a sectional view through the fastener illustrated in FIG. 1 showing the configuration of bosses formed in the two leads of the embodiment of FIG. 1.
Figure 2:
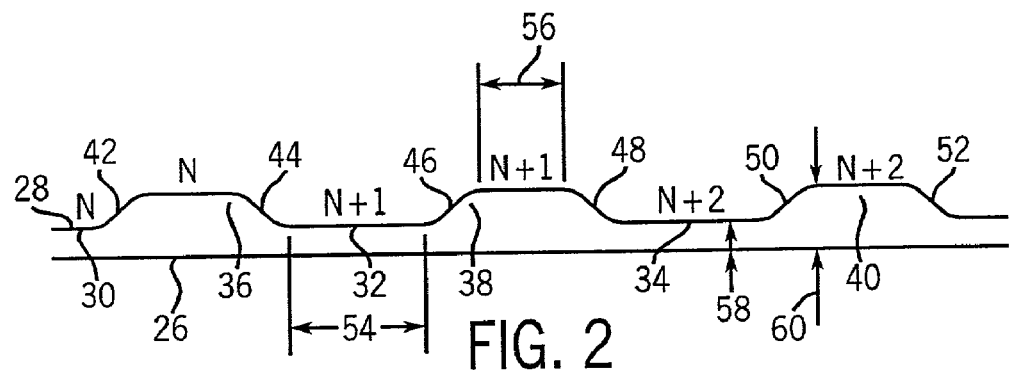
FIG. 2 is a diagram illustrating an exemplary lead of a fastener such as that illustrated in FIG. 1.

FIG. 1A illustrates a sectional view through the fastener of FIG. 1. As shown in FIG. 2, the bosses 24 formed along the shank of the fastener are positioned with respect to one another to provide a desired pattern for entry and exit of the bosses into a material being fastened. In particular, the bosses 24 formed on lead 18 are positioned so as to correspond to recesses formed between bosses on lead 20. As described more fully below, it has been found the illustrated configuration of corresponding locations for recesses and bosses on the double-lead fastener facilitates insertion, enhances resistance to pullout, and provides locations in which materials may settle or flow. It may also be noted from the illustration of FIG. 1A that in the presently preferred configuration, two bosses 24 are located for each revolution of leads 18 and 20, with the bosses being offset from one another by 180 degrees.

FIG. 2 illustrates an exemplary thread profile for one of the leads in a fastener of the type illustrated in FIG. 1. In the diagram of FIG. 2, reference numeral 26 refers to the root of the thread, while reference numeral 28 refers to the thread crest profile itself. For the sake of illustration, multiple base profiles are illustrated, including a first base 30, a second base 32 and a third base 34. Along the length of the thread profile 28, these bases may be referred to as successive features N+1, and N+2. Similarly, a series of bosses are formed between the bases, including a first boss 36 adjacent to base 30, a second boss 38 adjacent to base 32, and a third boss 40 adjacent to base 34. These bosses, too, may be referred to as successive features in, N+1 and N+2. In the embodiment illustrated in FIG. 2, each of the bases 30, 32 and 34 are generally identical to one another, while each of the bosses 36, 38 and 40 are similarly identical to one another. That is, the length, height, form, and adjacent features of each of these bases and bosses are similar between the successive N, N+1 and N+2 levels.

While the identical features along the length of the thread profile may be highly desirable in certain applications, the present technique also permits features to be varied along the length of the lead. In the embodiment illustrated in FIG. 2, for example, each boss presents a lead-in profile and a lead-out profile which can be tailored to specific applications, such as to provide a desired insertion torque and pullout resistance. In the embodiment illustrated in FIG. 2, for example, the boss 36 at the N level has a lead-in 42 and a lead-out 44, while bosses 38 and 40 at the N+1 and N+2 levels lead-ins 46 and 50 respectively, and lead-outs 48 and 52 respectively. As described in greater detail below, these features can be altered along the length of the fastener to provide differing characteristics, such as for low insertion torque near the tip of the fastener with greater insertion torque as the fastener is progressively inserted, or vise versa. Similarly, pullout resistance can be varied by altering the same lead-in and lead-out profiles. As will be appreciated by those skilled in the art, in general, the lead-in profile will have a greater effect on the insertion torque, while the lead-out profile will have a greater effect upon the pullout resistance.

Figure 3:
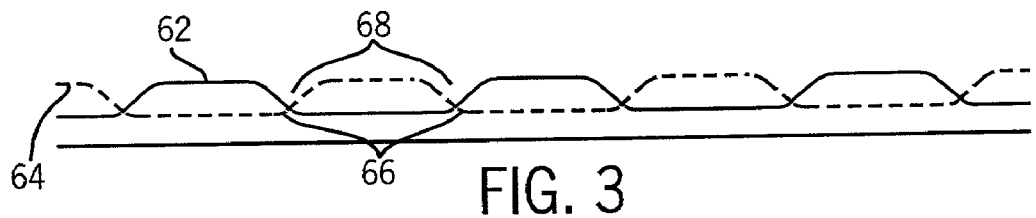
FIG. 3 is a diagram illustrating an exemplary configuration of two leads for a fastener such as that illustrated in FIG. 1 in accordance with particular aspects of the present technique.

Other features of the thread profile 28 illustrated in FIG. 2 may also be adapted for specific applications. By way of example, each base 30, 32 and 34 has a length, such as length 54 illustrated for base 32, which may be altered along the length of the fastener. That is, bases in levels in N+1 and N+2 may differ from one another, where desired. Similarly, each boss 36, 38 and 40 has a predetermined length, represented by reference numeral 56 for boss 38, which may be adapted and varied along the length of the fastener between the respective lead-in and lead-out profiles. Moreover, the height of the bases, as indicated at reference numeral 58, may be altered, as may the height 60 of the bosses. Other features, such as the configuration and shape of the bosses and bases may also be changed or evolve along the length of the fastener as described in greater detail below.

Where more than one lead is provided on the fastener, the features along each lead may simply repeat, or may evolve separately along their lengths, and the features may generally be positioned to correspond to one another in predetermined manners along the length of the shank. FIG. 3 illustrates, for example, profiles of a pair of leads 62 and 64, each presenting bases and bosses a described above with reference to FIG. 2. In addition to allowing for adaptation or tailoring of the bosses and bases along the length of each lead, the positions of these features may be provided in corresponding manners, such as to provide overlap 66 between lead-in and lead-out regions, or other regions of the leads, and separations 68 between such features. For example, where two leads are provided, lead-out portions of bosses from one lead may be positioned to correspond to lead-in portions of bosses from the second lead. Thus, relatively uniform insertion torque may be attained by alternating the boss being driven into the material to be fastened between the two leads. At the same time, the multiple lead-outs of the bosses from each lead aide, together, in resisting pullout.

Figure 4:
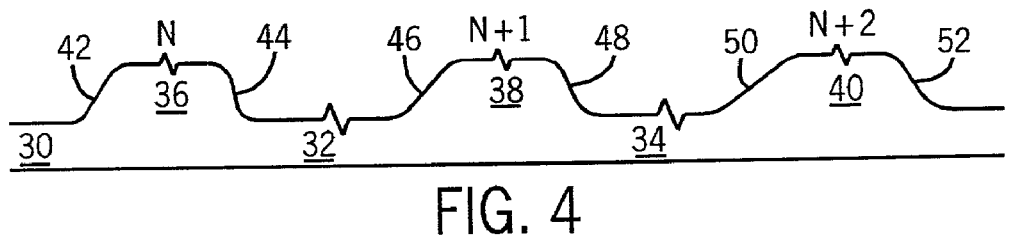
FIG. 4 is a diagram illustrating evolution of characteristics of a lead for a fastener of the type illustrated in FIG. 1 in accordance with aspects of the present technique.

FIG. 4 illustrates an exemplary embodiment of a lead profile wherein features including bases and bosses evolve along the length of the lead. As shown in FIG. 4, a first base 30 at a level N along the lead joins a first boss 36 at the N level by a lead-in 42. The boss 36 then joins a second base 32 at a level N+1 by a lead-out 44. As the lead continues, then, bosses 38 and 40 join bases 32 and 34 by lead-ins 46 and 50 respectively, with bosses 38 and 40 terminating lead-outs 48 and 52 respectively. At each level N, N+1 and N+2, then, differing angles and forms may be provided for the lead-ins and lead-outs to provide the desired insertion and pullout resistance characteristics described above.

Figure 5:
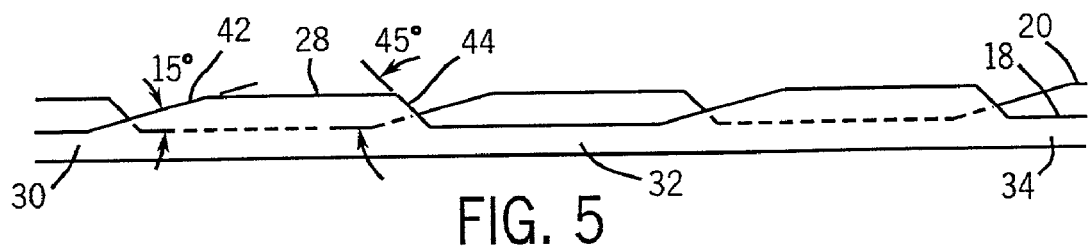
FIG. 5, is diagram similar to that of FIGS. 2, 3 and 4, illustrating a particularly preferred configuration of a double-lead fastener in accordance with aspects of the present technique.

As illustrated in FIG. 5, in a particularly preferred present configuration, the lead-in profiles of a double-lead fastener correspond in location about the shank to locations of the lead-out profiles of the second lead. Moreover, as shown in FIG. 5, it has been found that a relatively shallow lead-in angle, such as 15 degrees, facilitates insertion of the fastener in applications. Excellent pull-out resistance has been found with lead-out angles which are relatively steep, on the order of 45 degrees in the embodiment illustrated in FIG. 5. Thus, as noted above, the lead-in and lead-out profiles need not be identical to one another, and optimized profiles, such as a 15 degree/45 degree configuration of FIG. 5, may be found to be optimal for certain applications.

FIG. 6 illustrates a pair of leads for a fastener of the type shown in FIG. 1, provided with bases and bosses which correspond to one another in location and overlap as illustrated generally in FIG. 3. Reference numerals on the first lead 62 are labeled to correspond to those features illustrated in FIG. 2, including bases 30, 32 and 34, and bosses 36 and 38. Similar or identical bases and bosses are provided along the second lead 64. In the plan view of FIG. 6, however, it can be seen that the form, referred to generally by reference numeral 70 of each lead can evolve along the length of the lead between the fastener tip and head. By way of example, the width 72 of each boss can be identical along the length of the lead, or may be varied. Similarly, the lead-in form 74 may be modified to provide the desired performance characteristics, particularly the insertion torque. The lead-out form 76 may be tailored in a similar manner. In general, these features may be contoured, angled, or otherwise adapted, and, as mentioned above, need not be identical along the length of the leads.

Various techniques may be employed for manufacturing fasteners in accordance with the features described above. In a presently preferred method, electric-discharge machining (EDM) is employed to create dies which are then used to roll thread fastener blanks. To facilitate creation of the dies, EDM processes are used to create the features that evolve along the length of a roll thread forming die of the type generally known in the art. FIG. 7 illustrates an exemplary machining process for an EDM tool used in this technique. As shown in FIG. 7, the tool, designated generally by reference numeral 78, may be formed of any suitable material, typically graphite for EDM processes. The tool presents bosses 80 generally similar to the bosses which will be formed on the resulting fastener, and bases 82 similar to the bases of the leads desired on the fastener. Where evolution of the features is desired along the length of the threads, these will similarly evolve along the length of the bosses and bases formed on the EDM tool. Creation of the bosses and bases is performed in any suitable manner, such as through milling operations as illustrated in FIG. 7. In the embodiment of FIG. 7, the features are formed by end milling along tool pads 84, 86, 88 and 90 to form the lead profiles and the spaces separating the leads. Similar machining operations are performed along the entire surface of the EDM tool as needed, depending upon the size of the resulting die.

FIG. 8 illustrates a die for roll threading a fastener formed through the use of a tool such as that shown in FIG. 7. As will be appreciated by those skilled in the art, such roll threading dies, designating generally by the reference numeral 92 in FIG. 8, include a sharpening section 94 and a thread forming section 96. Grooves or striations are formed along the die, as shown in dashed lines in FIG. 8, to facilitate drawing the fastener blank along the die. As will also be appreciated by those skilled in the art, such dies are typically employed in pairs, with one die being stationary and a second die oscillating to draw and rotate the fastener blank therebetween and to form the threads. By a plunge EDM process, then, features are formed along the die corresponding to the bosses and bases of the fastener lead. Through use of a tool 78 as illustrated in FIG. 7, then, a die as illustrated in FIG. 8 will present a series of linear recesses, including relatively deeper recesses 98 corresponding to the desired bosses along the leads, and relatively shallower recesses 100 corresponding to the bases along the lead profile. It has been found that the use of plunge EDM processes for forming the dies for the present fastener profiles greatly facilitates the production of the dies, and the formation of the desired profiles along the fastener, particularly where these profiles may be varied.

FIG. 9 is a flow chart illustrating exemplary steps in a process for forming dies and fasteners in accordance with aspects of the technique described above. The method, designated generally by reference numeral 102 in FIG. 7, begins with machining of the EDM tool at step 104. Again, step 104 may include any suitable machining processes, such as milling of the features desired on the resulting fastener. As step 106, the thread rolling dies are formed by plunge EDM processes to create the progressive thread forming recesses as described above with reference to FIG. 8. At step 108 fastener blanks are formed. As will be appreciated by those skilled in the art, such blanks typically include an unthreaded shank dimension to provide sufficient material for the threads which are upset from the shank during the thread rolling operation. Finally, at step 110 the multi-boss threads are rolled onto the blanks through the use of specially adapted dies such as that illustrated in FIG. 8.

FIG. 10 illustrates an alternative embodiment in accordance with aspects of the foregoing technique, wherein a single lead is provided. While the double-lead configuration provides excellent torque characteristics, in certain applications, aspects of the present technique may be incorporated with a single lead. Thus, in the embodiment of FIG. 10, rather than separate leads 18 and 20, the reference numerals refer to turns of the same lead. For enhancing insertion torque and resistance to pull-out, however, the forgoing teachings with regards to the presence of bosses 24, and to the configuration of the bosses, differences between bosses, differences between lead-in and lead-out profiles, and so forth, may be incorporated into the single-lead fastener.

As noted above, the present technique provides for excellent insertion torque and high resistance to pull-out. FIG. 11 illustrates exemplary insertion torque of a fastener having two leads with correspondingly located bosses and recesses as described above. As shown in FIG. 11, reference numeral 120 refers to a torque curve for insertion torques as the fastener is inserted into a base material. As illustrated in the Figure, the torque curve begins at a fairly low level 122 as the fastener is begun to be inserted. Thereafter, torque increases somewhat within a middle range 124, but remains relatively constant as compared to conventional lobed fasteners. While some undulation may be encountered where bosses begin entry into the material, it has been found that such changes in insertion torque are extremely minimal. As also noted above, the present technique provides a fastener having excellent resistance to pull-out. It has been found, in particular, that ratios in excess of 1:1 can be obtained through the present technique (i.e., pull-out to insertion torques). While conventional fasteners may obtain ratios on the order of 0.8:1, tests have indicated that double-lead fasteners configured in accordance with the foregoing teachings can obtain ratios on the order of 1.1:1 (in materials such as nylon) and higher.

Figure 12:
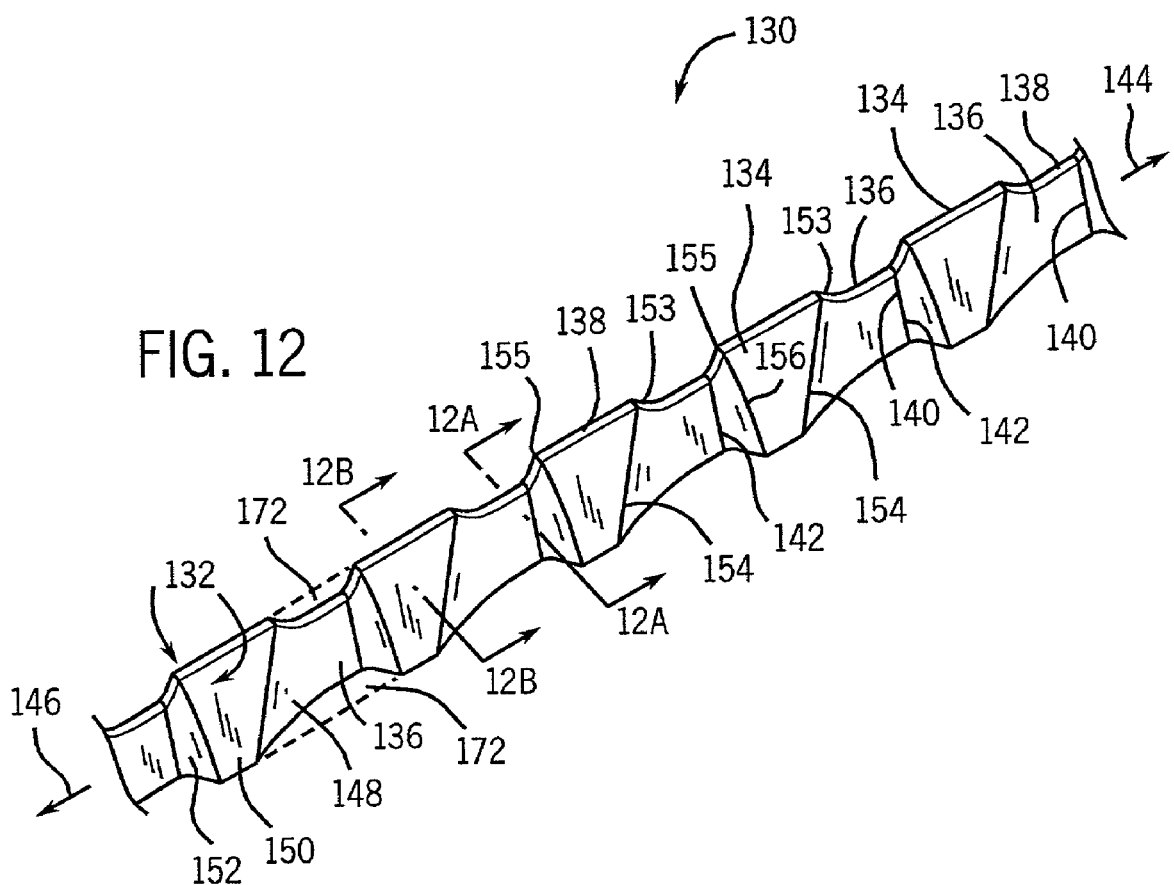
FIG. 12 is a perspective view of a lead form of a threaded fastener, in accordance with aspects of the present technique.
Figure 13:
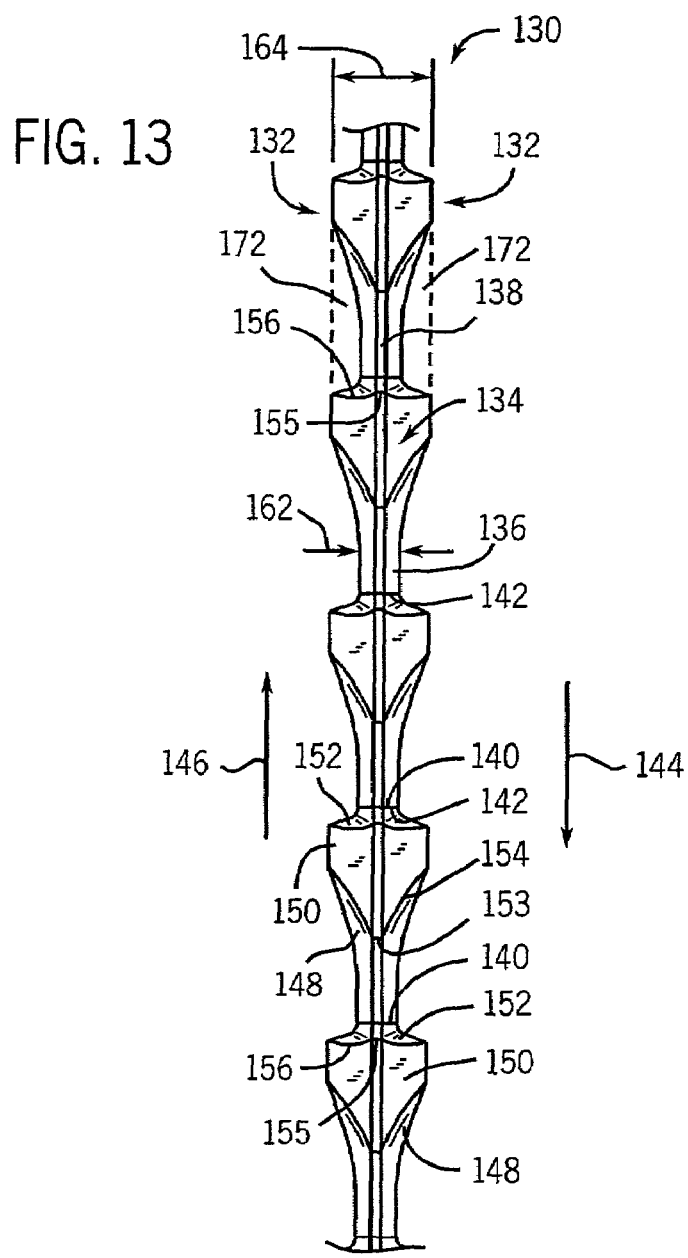
FIG. 13 is a top view of the lead form of FIG. 12.
Figure 14:
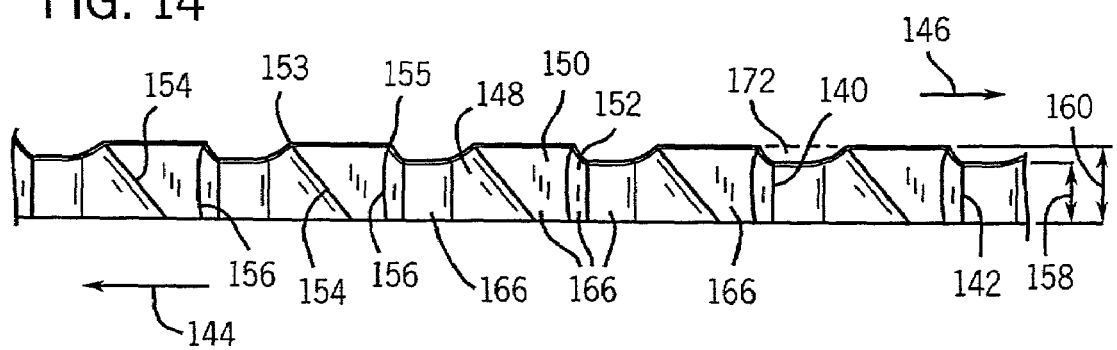
FIG. 14 is a side view of the lead form of FIG. 12.

The performance characteristics of a lead form can be defined by the heights and widths of the various portions of the lead form, as well as by their respective rates of change. Another alternative embodiment of a lead form 130 for a threaded fastener is illustrated in FIGS. 12–14. The alternative embodiment lead form 130 illustrates the ability of the above-described technique to vary the heights and widths of various portions of a lead form, as well as their respective rates of change. In the illustrated embodiment, the lead form 130 has two symmetrical portions 132. However, the lead form 130 may be non-symmetrical. The illustrated lead form 130 has a series of bosses 134 that extend from a series of bases 136. The series of bases 136 strengthen the series of bosses 134 and may not interact with a workpiece as the fastener is threaded into the workpiece. In addition, the series of bases 136 provide a volume for fastener material flow during the thread rolling process. The bosses 134 formed along the shank of the fastener are positioned with respect to one another to provide a desired pattern for entry and exit of the bosses into a material.

In the illustrated embodiment, each boss 134 has a corresponding base 136. The series of bosses 134 and bases 136 has a crest 138. For reference purposes, each boss 134 and base 136 pair has a first end 140 and a second end 142. The second end 142 of one boss and base pair is the first end 140 of a subsequent boss 134 and base 136 pair, and so forth. As described more fully below, the threaded fastener can be manufactured with the lead form 130 having a plurality of orientations around the shank of the fastener. In a first orientation, the fastener is manufactured with the lead form 130 extending helically around the fastener such that the first ends 140 are oriented toward the tip of the fastener. In a second orientation, the threaded fastener is manufactured with the lead form 130 extending helically around the fastener in an opposite direction, such that the second ends 142 of the lead form are oriented toward the tip. It has been found that having the lead form 130 oriented in the first orientation provides desirable characteristics for insertion of the threaded fastener into certain materials, such as concrete, while orienting the lead form in the second orientation provides desirable characteristics for insertion of the threaded fastener into materials other than concrete, such as aluminum and other hard materials.

In the first orientation of the lead form 130, the lead form 130 propagates in a first direction during insertion of the fastener, as represented by the first arrow 144. In the second orientation of the lead form 130, the lead form 130 propagates in a second direction during insertion of the fastener, as represented by the second arrow 146. In the illustrated embodiment, a continuous sharp feature is presented to the material during insertion of the fastener by having a plurality of bosses 134 located along the length of the fastener. In addition, in the illustrated embodiment, each boss has at least one cutting surface oriented for cutting in a first direction and at least one cutting surface oriented for cutting in a second direction, the second direction being opposite to the first direction.

In the illustrated embodiment, each boss 134 has a first portion 148, a second portion 150, and a third portion 152. The first portion 148 is the lead-in portion of the boss 134 and the third portion 152 is the lead-out portion when the lead form 130 is oriented in the first orientation. In the first orientation, the first portion 148 and the second portion 150 of each boss 134 combine to form a first cutting feature 153 along the crest 138 of the lead form 130. In addition to the first cutting feature 153, the first and second portions define first cutting edges 154. The first cutting edges 154 extend from the first cutting feature 153 towards the root 26 of the thread on each symmetrical portion 132 of the lead form 130. The first cutting feature 153 maintains an edge as the second and third portions of the boss are worn during insertion of the fastener into the material. The first cutting edges 154 are used for tapping the material. In the illustrated embodiment, the first cutting edges 154 extend from the root to the crest 138 and are inclined towards the first direction of propagation 144 of the lead form 130. In addition, in this embodiment, the first cutting edges 154 are curved because of the generally non-linear shape of the first portion and the generally linear shape of the second portion.

The third portion 152 is the lead-in portion of the boss 134 and the first portion 148 is the lead-out portion when the lead form 130 is oriented in the second orientation. The second portion 150 and the third portion 152 also combine to form a second cutting feature 155 and second cutting edges 156. The second cutting edges 156 extend from the second cutting feature 155 towards the root 26 of the thread on each symmetrical portion 132 of the lead form 130. The second cutting feature 155 and second cutting edges 156 are cutting surfaces when the lead form is oriented in the second orientation. By having a plurality of bosses 134 along the length of the fastener, each having cutting features and cutting edges when oriented in either direction, a continuous sharp feature is presented to the material as the fastener is inserted.

Figure 12A:
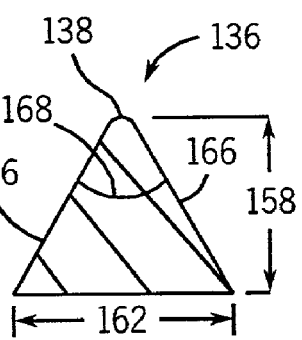
FIG. 12A is a sectional view through the lead form of FIG. 12, taken generally along line 12A—12A of FIG. 12.
Figure 12B:
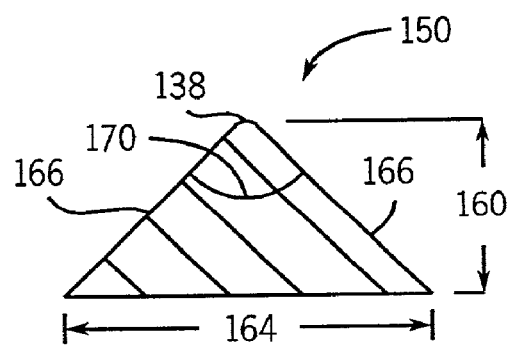
FIG. 12B is a sectional view through the lead form of FIG. 12, taken generally along line 12B—12B of FIG. 12.

In the illustrated embodiment, the heights and the widths of the various portions of the lead form 130 vary between the various portions of each boss 134 and base 136. As best illustrated in FIGS. 12A and 12B, the crest 138 has a first height 158 along the base 136 and a second height 160 along the second portion 150 of each boss 134. The first height 158 is lower than the second height 160. The second height 160 defines the outer diameter of the threaded fastener. As best illustrated in FIGS. 12 and 14, the height of the crest 138 rises through the first portion 148 of each boss 134 to the second portion 150. In the illustrated embodiment, the rate of change in the height of the first portion 148 preferably is non-linear, at least in the region of the first portion 148 adjacent to the second portion 150 of the boss 134. The non-linear change in height of the first portion 148 produces a sharper cutting edge in the first cutting feature 153 than would a linear change in height. The height of the third portion 152 of each boss 134 decreases towards the base 136 adjacent to the third portion 152 of the boss 134. The rate of change in height of the third portion also preferably is non-linear. In addition, the rate of change in the height of the third portion is greater than the change in height of the first portion in the illustrated embodiment. The difference in the rates of change of the heights of the first and third portions produces different cutting characteristics between the first and second cutting features.

As best illustrated in FIGS. 12A and 12B, each base 136 has a first width 162 and the second portion of the boss 134 has a second width 164. The first width 162 is less than the second width 164. As best illustrated in FIG. 14, the width of the first portion 148 of the boss 134 increases towards the second portion 150 of the boss 136. In this embodiment, the rate of change in the width of the first portion 148 preferably is non-linear. The width of the third portion 152 of each boss 134 decreases towards the base 136 adjacent to the third portion 152 of the boss 134. In this embodiment, the rate of change in the width of the third portion 152 also preferably is non-linear. In the illustrated embodiment, the rate of change in the width of the third portion 152 of each boss also is greater than that of the first portion 148 of the boss 134, thereby enabling further differences in the insertion torque and pull-out strength characteristics of the fastener in the first and second orientations.

In the illustrated embodiment, each portion of the boss 134 and each base 136 has a pair of symmetrical faces 166 located on their outer surfaces. As best illustrated in FIG. 12A, each face 166 of each base 136 is angled in relation to its symmetrical counterpart. In this embodiment, the faces of each base 136 are angled at an angle 168 of approximately 30 degrees. As best illustrated in FIG. 12B, each face 166 of the second portion of each boss 134 also is angled from the crest 138. In this embodiment, the faces of each base 136 are angled at an angle 170 of approximately 30 degrees. However, both the first and second angles may vary from these values. The angle of the faces 166, as well as the height of the crest 138, in the first portion 148 of each boss 134 increases towards the second portion 150 of the boss 134.

In the illustrated embodiment, a void volume 172, as represented by the dashed lines, is established above each face 166 of each base 136 below the height of the second portion 150 of the boss 134. Debris produced during the insertion of the fastener in the material is collected in the void volume 172 without negatively affecting the torque required to drive the screw and cut threads into the material. The lower first height 158 and first width 162 of the base 136 also reduce the surface area for friction between the fastener and the material, also reducing the insertion torque. Adjusting the rate of change in the thickness of the first portion 148 of the boss 134 directly affects the torque required to install the threaded fastener into the object material. In addition, the angle 170 of the second portion 150 defines the finished thread angle of the tapped hole in the material.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention is to cover all modifications, equivalents, and alternatives falling within the spirit and scope of the invention as defined by the following appended claims.

What is claimed is:

1. A threaded fastener comprising:
  a shank having a lead form extending around the shank, the lead form comprising:
    a first lead form portion having a first substantially uniform height over a first length;
    a second lead form portion having a second substantially uniform height over a second length, the second height being greater than the first height; and
    a third lead form portion intermediate the first and second lead form portions, the third lead form portion having a changing height, wherein the change in height of the third lead form from the first height to the second height is non-linear in profile.

2. The fastener as recited in claim 1, wherein the first lead form portion has a first width and the second lead form portion has a second width, the second width being greater than the first width, wherein the third lead form portion has a base having a width.

3. The fastener as recited in claim 1, wherein the second and third lead form portions define a sharp cutting edge.

4. The fastener as recited in claim 1, wherein the lead form is helical.

5. A threaded fastener, comprising:
  a shank portion; and
  a lead form extending around the shank portion comprising:
    a first lead form portion having a first substantially uniform height dimension over a first length;
    a second lead form portion having a second substantially uniform height dimension over a second length, the second height dimension being greater than the first height dimension; and
    a third lead form portion having a third height dimension, the third height dimension being variable from the first height dimension to the second height dimension as considered in a height direction extending from a root portion of the lead form to a crest portion of the lead form, the second lead form portion being interposed between the first and third lead form portions;
    wherein at least one of the first and third lead form portions has a base at the thread root portion that is variable width dimension as considered in a width direction extending along a length of the lead form.

6. The fastener as recited in claim 5, wherein the first lead form portion comprises a first width and the second lead form portion comprises a second width, the second width being greater than the first width; and wherein the third lead form portion has a base having a width.

7. The fastener as recited in claim 5, wherein the second and third lead form portions define a sharp cutting edge.

8. The fastener as recited in claim 5, wherein the lead form is helical.

* * * * *